US010234258B2

(12) United States Patent
Meinders et al.

(10) Patent No.: US 10,234,258 B2
(45) Date of Patent: Mar. 19, 2019

(54) DEVICE AND METHOD FOR DETECTING YARN CHARACTERISTICS

(71) Applicant: Aladdin Manufacturing Corporation, Calhoun, GA (US)

(72) Inventors: Maarten Meinders, Dalton, GA (US); Zhuomin Ding, Ooltewah, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 86 days.

(21) Appl. No.: 15/434,999

(22) Filed: Feb. 16, 2017

(65) Prior Publication Data

US 2018/0231365 A1 Aug. 16, 2018

(51) Int. Cl.

*G01B 5/06* (2006.01)
*G01B 11/06* (2006.01)
*D02J 1/08* (2006.01)

(52) U.S. Cl.

CPC ................ *G01B 5/068* (2013.01); *D02J 1/08* (2013.01); *G01B 11/0691* (2013.01)

(58) Field of Classification Search

CPC .. D02J 1/08; G01B 5/06; G01B 5/068; G01B 5/08; G01B 5/10; G01B 7/06; G01B 7/068; G01B 7/12; G01B 7/125; G01B 11/06; G01B 11/0691; G01B 11/08; G01B 11/10; G01N 33/36; G01N 33/365

USPC .......... 33/501.04, 504; 57/264, 265; 73/160; 226/44; 356/238.2

See application file for complete search history.

(56) References Cited

U.S. PATENT DOCUMENTS 3,793,883 A 2/1974 Goldfarb et al.
3,827,296 A * 8/1974 Hidaka .................. G01N 27/82 340/677
3,902,364 A * 9/1975 Craig et al. .............. G01B 5/10 73/160
4,051,722 A * 10/1977 Feller .................. G01N 33/365 73/160
4,078,231 A 3/1978 Artzt et al.
(Continued)

FOREIGN PATENT DOCUMENTS

EP 918217 A2 5/1999

OTHER PUBLICATIONS

US 6,170,325, 01/2001, Hinchliffe (withdrawn)
(Continued)

*Primary Examiner* — R. A. Smith
(74) *Attorney, Agent, or Firm* — Alston & Bird LLP

(57) ABSTRACT

Various embodiments are directed to a yarn analyzer comprising a measurement mechanism configured to monitor the local thickness of the yarn moving along a yarn path. The measurement mechanism comprises a fixed member and a displaceable member between which the yarn path passes. The displaceable member is secured relative to a mechanical amplifier comprising a pivotable lever arm at a first end of the pivotable lever arm at a short distance from the pivot axis of the lever arm, and is biased toward the fixed member. The measurement mechanism further comprises a displacement sensor configured to monitor the displacement of a reference component secured relative to a second end of the lever arm at a long distance from the pivot axis. The monitored movement of the reference component is correlated with the thickness of the yarn, such that the yarn thickness is recorded for the length of yarn.

17 Claims, 3 Drawing Sheets

(56) References Cited

U.S. PATENT DOCUMENTS

| | | | | |
|---|---|---|---|---|
| 4,133,207 | A | 1/1979 | Weidmann et al. | |
| 4,165,638 | A | 8/1979 | Verlin | |
| 4,195,345 | A | 3/1980 | Artzt et al. | |
| 4,213,056 | A | 7/1980 | Matsumura et al. | |
| 4,246,748 | A | 1/1981 | Artzt et al. | |
| 4,393,701 | A | 7/1983 | Lawson | |
| 4,648,054 | A | 3/1987 | Farah et al. | |
| 4,719,576 | A | 1/1988 | Sano et al. | |
| 4,891,974 | A * | 1/1990 | Wassenhoven | D01H 13/26 57/264 |
| 4,990,793 | A | 2/1991 | Bonigk et al. | |
| 5,140,852 | A | 8/1992 | Bonigk et al. | |
| 5,195,313 | A | 3/1993 | Coons, III | |
| 5,319,578 | A | 6/1994 | Lawson et al. | |
| 5,420,439 | A | 5/1995 | Landwehrkamp et al. | |
| 5,541,734 | A | 7/1996 | Nevel et al. | |
| 5,570,188 | A | 10/1996 | Nevel et al. | |
| 5,791,542 | A | 8/1998 | Porat et al. | |
| 6,025,727 | A | 2/2000 | Inkpen et al. | |
| 6,303,938 | B1 | 10/2001 | Weinsdorfer et al. | |
| 6,307,953 | B1 | 10/2001 | Nevel et al. | |
| 6,449,008 | B1 | 9/2002 | Hinchliffe | |
| 6,606,938 | B2 | 8/2003 | Taylor | |
| 6,741,726 | B1 | 5/2004 | Nevel et al. | |
| 6,877,305 | B2 * | 4/2005 | Weichel et al. | B65H 63/061 57/264 |
| 7,983,785 | B2 | 7/2011 | Inkpen et al. | |
| 8,131,483 | B2 | 3/2012 | Ross et al. | |
| 8,669,757 | B2 | 3/2014 | Inkpen et al. | |
| 2011/0276280 | A1 | 11/2011 | Ross et al. | |
| 2012/0125119 | A1 | 5/2012 | Ross et al. | |

OTHER PUBLICATIONS

Instrumar Limited, "The Instrumar Fiber System", retrieved from <http://www.instrumar.com/fibersystem.htm> on May 15, 2017, 4 pages.

Lawson-Hemphill, "Textured Yarn Tester—Electronic Drive LH-131 TYT-E" Brochure, retrieved from <http://www.lawsonhemphill.com/tyt-textured-yarn-tester---electronic-drive.html > on May 15, 2017, 2 pages.

Polyspintex, Inc, "RICa Interlace Counter", retrieved from <http://www.hellotrade.com/polyspintex-usa/interlace-counter.html> on May 15, 2017, 4 pages.

* cited by examiner

DEVICE AND METHOD FOR DETECTING YARN CHARACTERISTICS

BACKGROUND

In certain yarn or other textile manufacturing processes, multi-filament yarns may undergo one or more internal binding, knotting, and/or tangling processes to produce yarns having desirable yarn characteristics, such as tensile strength, thickness, intermingling, intra-yarn cohesion, and/or the like. As just one example, interlacing (also known as tangling, entangling, and intermingling) serves to tangle the multiple filaments of a yarn along the length of the yarn to provide intra-yarn cohesion between the various filaments that collectively form the yarn.

In the interlacing process, a continuous, multi-filament yarn is directed along a yarn path at a defined tension. The yarn path passes through a tangling jet configured to direct a pressurized stream of air at the yarn from a direction that may be perpendicular or at an acute angle relative to the yarn's direction of travel along the yarn path. The pressurized air stream causes the filaments of the yarn to separate and then collapse together, thereby forming periodic tangled bundles of filaments ("nodes") along the length of the yarn.

The relative size and positioning of the nodes may affect characteristics of the resulting yarn, and therefore various devices have been used to monitor the relative positions of the nodes along the length of yarns. However, historical attempts to monitor yarn interlacing characteristics have been subject to inconsistent and/or inaccurate accounting of interlacing characteristics. For example, natural variances in yarn thickness due to aspects of the yarn unrelated to interlacing and/or the relative size of loose nodes encompassing air pockets may result in inaccurate counting of nodes, and historical attempts to monitor interlacing characteristics have been unable to simultaneously monitor a plurality of interlacing characteristics such as node size, slack length (distance between nodes), and/or the like, of a particular yarn.

Accordingly, a need exists for a robust yarn characteristic monitoring device and method for monitoring a plurality of interlacing characteristics for continuous yarns.

BRIEF SUMMARY

Various embodiments are directed to yarn analyzers configured to accurately and precisely measure the effective thickness of a yarn moving along a yarn path and associated methods. The yarn analyzer measures the thickness of the yarn while the yarn is subject to a compressive force to measure the effective thickness of the yarn, while reducing the thickness of included air pockets within the yarn. Relative changes in the thickness of the yarn are amplified by the yarn analyzer, and the amplified thickness measurement is monitored to enable precise detection of small changes in yarn thickness.

Various embodiments are directed to a yarn analyzer comprising: a plurality of yarn alignment mechanisms collectively defining a yarn path through the yarn analyzer; measurement nip members positioned along the yarn path, and a measurement mechanism. In various embodiments, the measurement nip members comprise a fixed member positioned on a first side of the yarn path; and a displaceable member positioned on a second side of the yarn path opposite the first side, wherein the displaceable member is moveable relative to the fixed member and the displaceable member is biased toward the fixed member; and the measurement mechanism comprises a mechanical amplifier secured relative to the displaceable member and configured to amplify the movement of the displaceable member; and a displacement sensor configured to monitor the displacement of a portion of the mechanical amplifier.

Certain embodiments are directed to a method for measuring the thickness of a yarn. In certain embodiments, the method comprises: moving a yarn along a yarn path and between measurement nip members, wherein the measurement nip members comprise a fixed member and a displaceable member moveable relative to the fixed member, wherein the displaceable member is biased toward the fixed member, and wherein moving the yarn between the measurement nip members causes the displaceable member to move away from the fixed member by a distance corresponding to the thickness of the yarn; actuating a mechanical amplifier secured relative to the displacement member to amplify the movement of the displaceable member; monitoring the displacement of a portion of the mechanical amplifier; and determining the thickness of the yarn based on a displacement distance of the portion of the mechanical amplifier.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
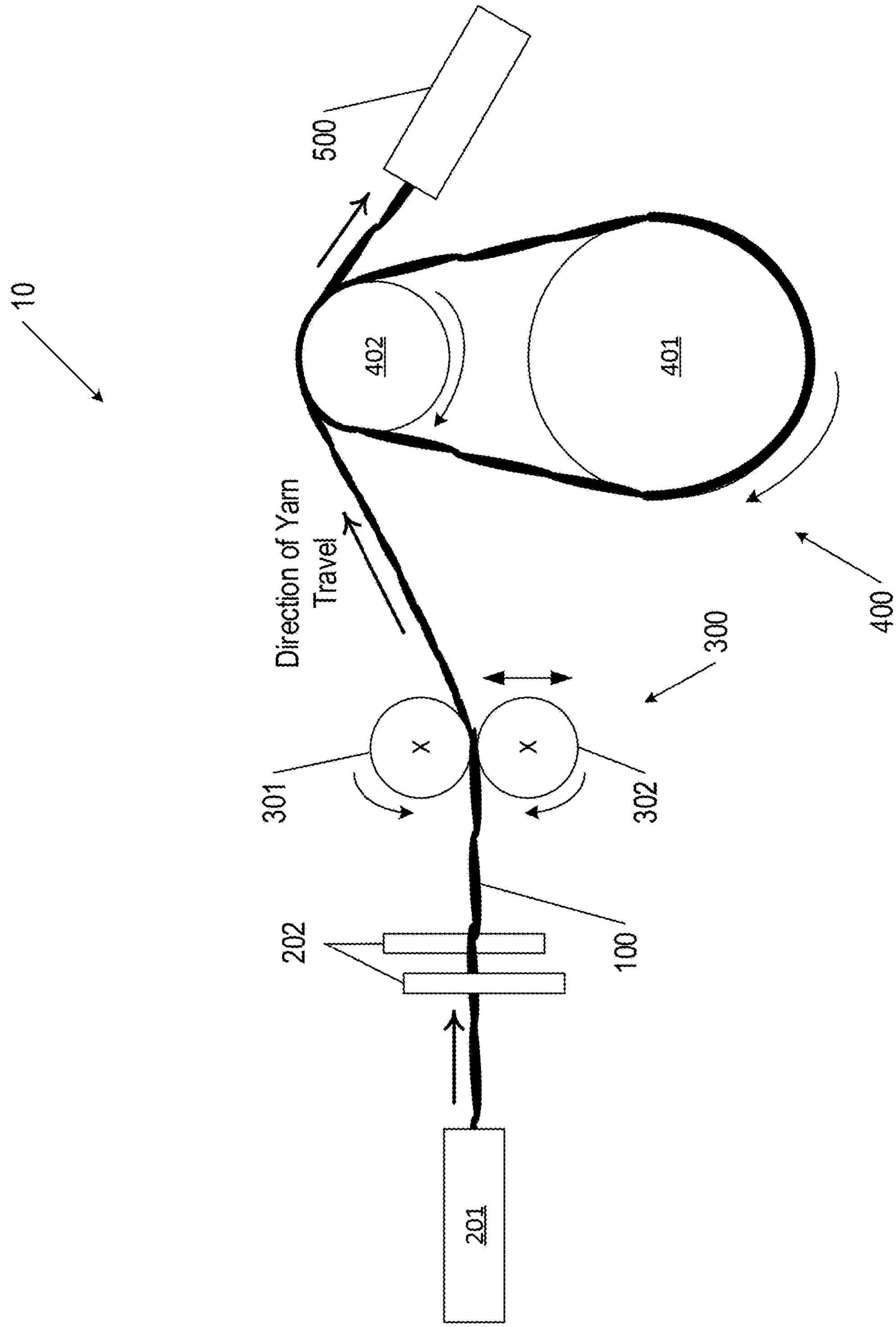
FIG. 1 is a schematic diagram of a yarn path through a yarn analyzer according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a yarn analyzer configured for monitoring a yarn thickness/diameter along a length of the yarn by applying a compressive force to the yarn and measuring the effective thickness of the yarn while the yarn is subject to the compressive force. Thus, the yarn analyzer is configured to monitor the effective thickness of the yarn while included air pockets (e.g., formed at least in part as a result of material elasticity) are compressed. For example, the yarn analyzer can be configured to detect and distinguish between nodes of an interlaced yarn (e.g., bundles of tangled filaments) and unbundled, slack sections of the interlaced yarn. By measuring the effective thickness of the yarn while the yarn is placed under a tensile force along the length of the yarn and a compressive force perpendicular to the length of the yarn, the material analyzer may distinguish between slack sections of yarn (the filaments may spread out and create a thin section of yarn when subject to the compressive force); loosely bundled but large nodes (the loose bundle of filaments within these nodes may compress slightly under the compressive force); and strong, tightly bundled nodes (the tight bundle of filaments within these nodes may not compress or may compress only slightly under the compressive force).

In certain embodiments, the yarn analyzer comprises alignment mechanisms collectively defining a yarn path between a yarn input (e.g., proximate a tensioner) and a yarn output (e.g., a waste output, an output of a production line and/or a portion of the production line, and/or the like). The yarn path leads through alignment members, through a thickness monitoring mechanism, and through/around a drive mechanism (e.g., around a take-up roller and/or one or more follower rollers). For example, the yarn path leads through nip members (e.g., rollers) of the thickness monitoring mechanism, comprising a fixed first roller and a displaceable second roller biased toward the first roller. Thus, the nip members collectively provide a compressive force to the yarn and the distance between the nip members corresponds to the effective thickness of the yarn positioned therein. Moreover, the biasing force of the displaceable second roller maintains the second roller in contact with the yarn passing through the nip members.

The displaceable second roller is rotatably secured relative to a mechanical displacement amplifier mechanism (e.g., a lever mechanism) configured to amplify the relative displacement of the second displaceable roller caused by changes in the effective thickness of the yarn moving along the yarn path. In certain embodiments, the yarn analyzer further comprises a measurement mechanism comprising a displacement sensor configured to monitor the displacement of a portion of the mechanical amplifier to enable the yarn analyzer to detect small changes in thickness of the yarn.

Yarn Path

With reference first to FIG. 1, which schematically illustrates example guide mechanisms defining a yarn path through a yarn analyzer 10 according to one embodiment. The yarn path illustrated in FIG. 1 is configured to maintain alignment of the yarn 100 traveling along the yarn path relative to the measurement mechanism discussed herein, while maintaining a desired tension on the yarn 100.

The guide mechanisms comprise a tensioner 201 configured to maintain a desired tension on the yarn 100 as it travels along the yarn path. The yarn 100 exits the tensioner, and travels through an alignment mechanism 202 before entering a measurement mechanism 300. In the illustrated embodiment of FIG. 1, the alignment mechanism 202 comprises a plurality of alignment members (e.g., pins, rollers, and/or the like) aligned in a direction perpendicular to the yarn path, and defining a gap therebetween. The yarn path passes through the gap between the spaced alignment members such that the alignment members impede movement of the yarn 100 in a direction perpendicular to the indicated yarn direction of travel. For example, the yarn path may be at least substantially horizontal, and the alignment members impede movement in a second horizontal direction perpendicular to the yarn path. The alignment members may each comprise fixed alignment members (e.g., non-rotating) configured such that the yarn 100 slides along a surface of the alignment members as it moves along the yarn path. The alignment members may comprise a non-abrasive material, such as a ceramic material, such that the alignment members do not abrade the yarn 100 as the yarn 100 moves along the surface of the alignment members, and the yarn 100 does not abrade the surface of the alignment members. In certain embodiments, the alignment members may be rotating alignment members (e.g., rollers) to impede abrasion of the yarn 100. Although the illustrated embodiment comprises a single pair of alignment members, it should be understood that various embodiments may comprise more than a single pair of alignment members, for example, to guide the yarn 100 around corners or otherwise along a desired yarn path.

Figure 2:
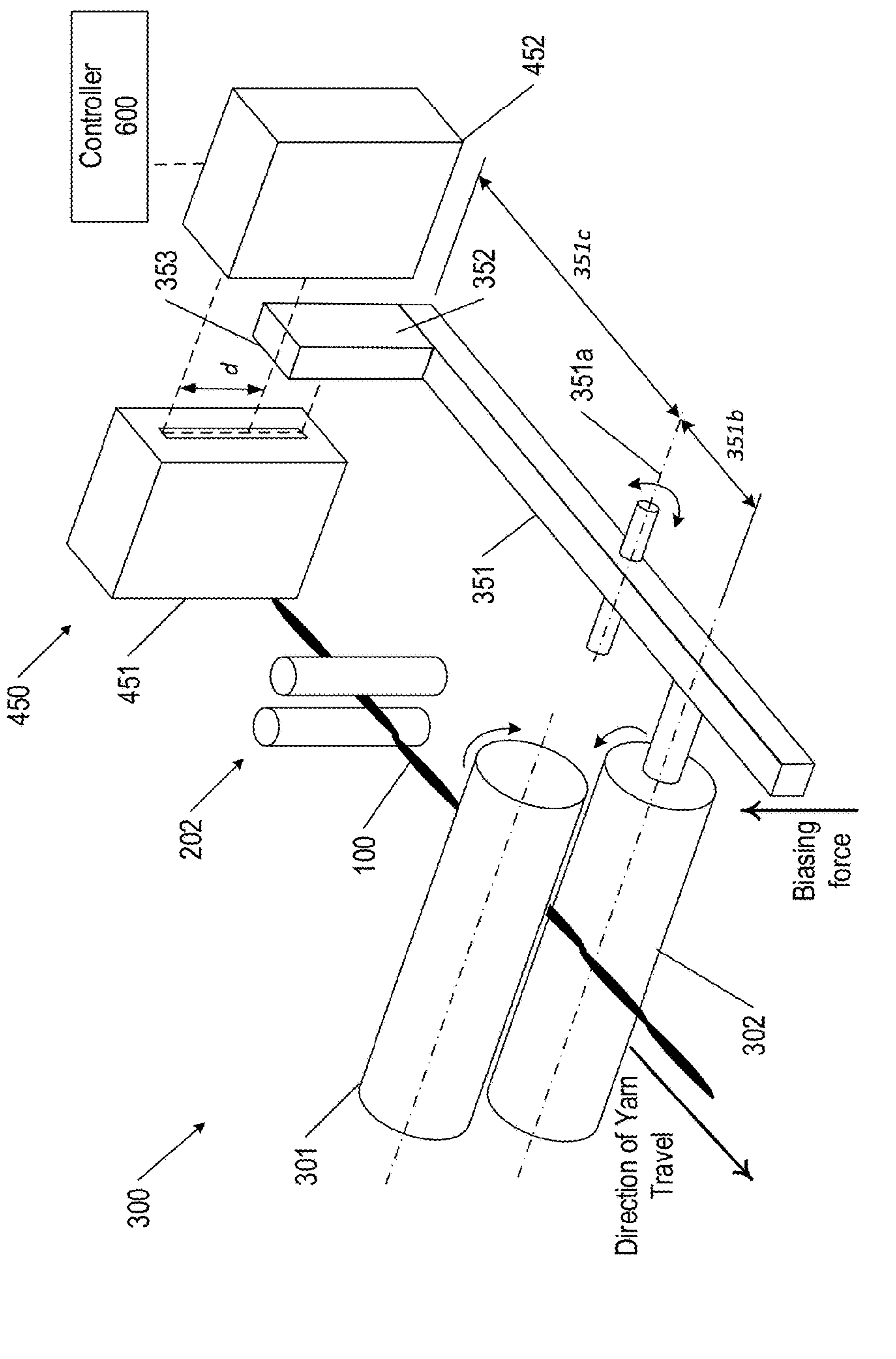
FIG. 2 is a diagram illustrating a portion of a yarn analyzer according to various embodiments.

As mentioned above, after moving through the alignment mechanism 202, the yarn 100 is directed through a portion of the measurement mechanism 300. In the illustrated embodiments of FIGS. 1-2, the alignment mechanism 202 comprises vertical alignment pins and a measurement mechanism 300 comprising a first fixed member 301 and a second displaceable member 302 collectively forming a nip along the yarn path. As shown in FIGS. 1-2, the first member 301 and the second member 302 are at least substantially parallel and at least substantially horizontal, and are perpendicular to the direction of yarn travel. However, the first and second members could be positioned in other orientations. In various embodiments, the first member 301 and the second member 302 are perpendicular to the direction of yarn travel and the alignment members of the alignment mechanism 202. Moreover, in the illustrated embodiments of FIGS. 1-2, the first member 301 and the second member 302 are rollers. However, in certain embodiments, one or both of the first member 301 and the second member 302 may be a non-rotating pin (e.g., a ceramic pin).

As discussed herein, the first fixed member 301 is secured at a fixed position relative to the yarn path. For example, the first fixed member 301 may be rotatably mounted relative to a housing (e.g., a surface of the yarn analyzer 10) in embodiments in which the first fixed member 301 comprises a roller, or rigidly secured relative to a housing in embodiments in which the first fixed member 301 comprises a non-rotating pin.

In the illustrated embodiments of FIGS. 1-2, the second displaceable member 302 may be movable in a direction at least substantially perpendicular to the direction of yarn movement and generally toward or away from the first fixed member 301. For example, the second displaceable member 302 may be moveable along a linear displacement path, an angular displacement path (e.g., about an axis of rotation 351*a* generally perpendicular to the direction of yarn movement), and/or the like. As will be discussed in greater detail herein with reference to the illustrated embodiment of FIG. 2, the second displaceable member 302 is biased toward the first fixed member 301, such that the second displaceable member 302 contacts the first fixed member 301 when no yarn is positioned between the first fixed member 301 and the second displaceable member 302, and the second displaceable member 302 maintains contact with the yarn 100.

With reference again to the illustrated embodiment of FIG. 1, the yarn path exits the yarn thickness analyzer 300 and travels to a drive mechanism 400. In the illustrated embodiment of FIG. 1, the drive mechanism comprises a take-up roller 401 and a follower roller 402. In the illustrated embodiment of FIG. 1, the yarn path follows the contour of at least a portion of the first fixed member 301, and extends at least partially upward between the yarn thickness analyzer 300 and the take-up roller 401. The weight of the yarn 100 is not substantially supported by the second displaceable member 302 (located below the yarn path) while travelling along the yarn path, and accordingly the weight of the yarn 100 does not provide a substantial displacement force to the second displaceable member 302 to cause the second displaceable member 302 to substantially displace away from the first fixed member 301.

Although not shown, the take-up roller 401 may be driven by a drive mechanism (e.g., a motor) to pull the yarn 100 along the yarn path. As discussed herein, the drive mechanism may be configured to move yarn at a desired yarn speed, which may be controlled by controller 600 (e.g., a laptop computing device, a handheld computing device (e.g., a smartphone, PDA, tablet, and/or the like), a desktop computing device, and/or the like), shown schematically in FIG. 2. The follower roller 402 may be freely rotatable, such that the follower roller 402 rotates with the take-up roller 401 when yarn is directed along the yarn path. Although not shown, the yarn path may define a plurality of loops around the take-up roller 401 and the follower roller 402 (e.g., 5 loops, 7 loops, and/or the like) before the yarn 100 is directed to an output mechanism 500. By directing the yarn around the take-up roller 401 and the follower roller 402 for a plurality of loops, the yarn 100 may be frictionally engaged with the take-up roller 401 and the follower roller 402 to enable the take-up roller 401 to drive the yarn 100 while the tensioner 201 maintains a desired tension on the yarn 100 moving through the yarn analyzer 10.

As shown in FIG. 1, the yarn 100 is directed off the follower roller 402 and to an output mechanism 500 and/or to another portion of a continuous yarn path (e.g., aspects of a yarn production mechanism). For example, the output mechanism may comprise a vacuum waste jet directing the yarn 100 away from the yarn analyzer 10.

Measurement Mechanism

FIG. 2 shows components of a measurement mechanism 300 according to one embodiment. As shown in FIG. 2, the measurement mechanism 300 comprises the first fixed member 301 and the second displaceable member 302. As mentioned above, the yarn path passes between the first fixed member 301 and the second displaceable member 302, and causes the second displaceable member 302 to move away from the first fixed member 301 based on the thickness of the yarn 100.

With reference to FIG. 2, the second displaceable member 302 is secured relative to a mechanical amplifier mechanism 350 configured to amplify the displacement of the second displaceable member 302 to enable measurement of a proportionally amplified component displacement that may be correlated with the thickness of the yarn 100. In the illustrated embodiment of FIG. 2, the amplifier mechanism 350 is a mechanical amplifier mechanism comprising a pivotable lever 351 pivotably mounted about a pivot axis 351*a* (e.g., a horizontal pivot axis). The pivotable lever 351 may be have a low weight, such that the rotational inertia of the pivotable lever 351 is sufficiently low that a biasing member (discussed herein) biases the second displaceable member 302 relative to the first fixed member 301 such that the second displaceable member 302 is capable of following the thickness of a yarn 100 moving along the yarn path. For example, the second displaceable member 302 is configured to detect start and end points of nodes, and accordingly the pivotable lever 351 has a sufficiently low rotational inertia such that the second displaceable member 302 moves toward the first fixed member 301 via the biasing force of the biasing member at an end point of a recognized node. In the illustrated embodiment of FIG. 2, the second displaceable member 302 is mounted relative to a second end of the pivotable lever 351 on a second side of the pivot axis 351*a*, and at a mounting point located a distance 351*b* away from the pivot axis 351*a*. The second displaceable member 302 may be mounted directly to the lever arm 351 at the mounting location (e.g., rigidly mounted or pivotably mounted). However, in certain embodiments, the second displaceable member 302 may be mounted to the lever arm 351 via a mechanical linkage. For example, the second displaceable member 302 may be mounted relative to the lever arm 351 via a mechanical linkage enabling the second displaceable member 302 to displace along a linear displacement path (e.g., toward and away from the first fixed member 301) while causing the lever arm 351 to pivot by an angular distance proportional to the at least substantially linear travel distance of the second displaceable member 302.

As discussed herein, the second displaceable member 302 is biased toward the first fixed member 301 to form a nip collectively with the first fixed member 301. The second displaceable member 302 may be biased toward the first fixed member 301 by a biasing member (e.g., a spring) secured relative to the lever arm 351. In embodiments monitoring the relative thickness of a yarn, the biasing force compresses the yarn between the first fixed member 301 and second displaceable member 302 such that slack sections (e.g., lengths of yarn consisting of untangled filaments) are compressed, causing the filaments to spread apart between the first fixed member 301 and the second displaceable member 302, such that the distance between the first fixed member 301 and the second displaceable member 302 is at least substantially equal to the diameter of the filaments. However, the biasing force does not substantially compress nodes comprising tightly tangled filaments, such that the distance between the first fixed member 301 and the second displaceable member 302 is greater than the diameter of the filaments.

Although not shown in FIG. 2, the biasing member may comprise a tension spring secured relative to the second end of the lever arm 351 (proximate the second displaceable member 302) and configured to apply a tensile force proximate one of the first or second end of the lever arm 351 to rotate the lever arm 351 about the pivot axis 351*a* to bias the second displaceable member 302 toward the first displaceable member 301. As yet other examples, the biasing member may comprise a compression spring configured to apply a compressive force to the lever arm 351 proximate the first end, and/or the biasing member may comprise a torsion spring secured proximate the pivot axis 351*a* of the lever arm 351 to bias the second displaceable member 302 toward the first displaceable member 301. As discussed in greater detail herein, the biasing member may be adjustable, such that the amount of biasing force applied by the biasing member may be modified. For example, the effective length of the spring, a preload force on the spring, and/or the like may be modified to change the biasing force applied by the biasing member.

In the illustrated embodiment of FIG. 2, the amplifier mechanism 350 additionally comprises a reference component 352 having a reference edge 353 secured relative to the lever arm 351 at a reference component location located a distance 351*c* from the pivot axis 351*a*. As will be discussed in greater detail herein, the reference edge 353 may be an at least substantially flat edge that is at least substantially perpendicular to a measured displacement distance d of the reference edge 353.

As shown in FIG. 2, the reference component 352 may be rigidly and directly secured to, or integrally formed with, the lever arm 351 at the reference component location (e.g., via one or more fasteners, such as screws, bolts, adhesive, welds, and/or the like). In such embodiments, the reference component 352 and the reference edge 353 move along an angular displacement path about the pivot axis 351*a*. However, in certain embodiments, the reference component 352 may be secured via a mechanical linkage to the lever arm 351, such that the reference component 352 is configured to move along a linear displacement path at least substantially parallel to the measured displacement distance d of the reference edge 353 by a linear distance proportional to the angular displacement of the lever arm 351.

As shown in FIG. 2, the distance 351*c* between the reference component location and the pivot axis 351*a* is greater than the distance 351*b* between the mounting point and the pivot axis 351*a*. Accordingly, a displacement of the second displaceable member 302 (secured relative to the lever arm 351 at the mounting point) will cause a larger, amplified displacement of the reference component 352 (secured relative to the lever arm 351 at the reference component location). For example, in embodiments in which the second displaceable member 302 and the reference component 352 are both secured directly relative to the lever arm 351, the displacement of the reference component 352 is proportional to the displacement of the second displaceable member 302 by the ratio of distances 351*c*: 351*b*.

The measurement mechanism 300 of the yarn analyzer 10 may additionally comprise a displacement sensor 450 configured to measure the displacement of the reference edge 353 of the reference component 352 relative to a datum (e.g., an edge of a laser). In the illustrated embodiment of FIG. 2, the displacement sensor 450 comprises a laser edge detection mechanism, such as a Keyence IG series CCD laser micrometer, available from Keyence Corporation based on Osaka, Japan. As shown in FIG. 2, the displacement sensor 450 comprises a laser emitter 451 configured to emit a planar laser beam having a known width between a first laser edge and a second laser edge, and a laser receiver 452 configured to receive the emitted planar laser beam.

As shown in FIG. 2, the displacement sensor 450 is positioned to straddle the displacement path of the reference component 352 such that the laser emitter 451 is on a first side of the reference component 352 and the receiver 452 is on a second side of the reference component 352, opposite the first side. The laser emitter 451 emits the laser toward the receiver, across the displacement path of the reference component 352. Because the reference component 352 is positioned at least partially within the laser path between the laser emitter 451 and the laser receiver 452, at least a portion of the emitted laser is blocked by the reference component 352, such that the laser receiver 452 does not detect all of the emitted laser energy. For example, only a portion of the emitted laser corresponding to the distance between the first laser edge and the reference edge 353 (shown as d in FIG. 2) passes from the laser emitter 451 to the laser receiver 452. The displacement sensor 450 is configured to determine the amount of laser energy detected at the laser receiver 452 and/or the location at which laser energy is detected along the laser receiver 452, which is proportional to the current location of the reference component 352 (based on the amount of laser energy blocked by the reference component 352). For example, the displacement sensor 450 may be configured to transmit signals to a controller 600 configured to process raw data signals generated by the displacement sensor 450 and determine the relative position of the reference edge 353. In certain embodiments, the controller 600 may comprise a processor configured to process and/or manipulate received data, and a non-transitory storage medium for storing raw data signals and/or processed data signals.

Moreover, because the position of the reference edge 353 is indicative of the position of the second displaceable member 302 (via the lever arm 351 and/or one or more mechanical linkages), the controller 600 may be configured to determine the thickness of yarn 100 positioned between the second displaceable member 302 and the first fixed member 301 based on the determined distance between the second displaceable member 302 and the first fixed member 301. As a specific example, as the distance between the second displaceable member 302 and the first fixed member 301 increases (e.g., due to a relatively thick portion of yarn 100 moving between the first fixed member 301 and second displaceable member 302), the lever arm 351 rotates against the applied biasing force, moving the lever arm 351 and the reference component, thereby changing the amount of laser energy blocked by the reference component 352. In the illustrated embodiment of FIG. 2, as the distance between the second displaceable member 302 and the first fixed member 301 increases, the amount of laser energy blocked by the reference component 352 increases, and the amount of laser energy detected by the receiver 452 decreases. However it should be understood that, in certain embodiments, as the distance between the second displaceable member 302 and the first fixed member 301 increases, the amount of laser energy blocked by the reference component 352 decreases, and the amount of laser energy detected by the receiver 452 increases.

The displacement sensor 450 may be embodied as any of a plurality of displacement sensors. As an additional, non-limiting example, the displacement sensor 450 may be embodied as a proximity sensor configured to monitor the distance between the reference edge 353 and a sensor emitter and receiver as the reference edge 353 moves at least substantially vertically toward and/or away from at least a portion of the proximity sensor.

Measured Yarn Characteristics

In various embodiments, the yarn analyzer 10 may be configured to monitor one or more of the following yarn characteristics: local yarn thickness, gross node count, slack length between adjacent nodes, maximum slack length between adjacent nodes, average slack length between adjacent nodes, node length, maximum node length, average node length, node thickness, maximum node thickness, average node thickness, slack ratio (e.g., a ratio between the cumulative length of the identified nodes and the cumulative length of the identified slack sections), node ratio (e.g., percentage of a length of yarn 100 identified as a node), gross number of potential nodes, and/or the like.

In various embodiments, a controller 600 may receive raw data signals from the displacement sensor 450 (which may comprise data points each indicative of the relative position of the reference edge 353 and the time at which the data point was recorded), and may receive yarn analyzer control data signals. For example, the controller 600 may receive data indicative of a yarn 100 movement speed (e.g., meters/minute), a yarn 100 tension (e.g., grams), a biasing force for the second displaceable member 302 (e.g., grams), a sample rate for the displacement sensor 450 (e.g., samples/second), and/or the like. In various embodiments, the controller 600 may be configured to output yarn analyzer control signals to various components of the yarn analyzer 10 to control the functionality of the yarn analyzer 10. For example, the controller 600 may be configured to receive user input indicative of a desired yarn movement speed, and may output control signals to a drive mechanism 400 to effect the desired yarn movement speed.

The controller 600 may perform one or more analyses based on the received data to determine one or more yarn characteristics. As an initial matter, the controller 600 may utilize the yarn movement speed and the sample rate to determine a sample rate per length of yarn (e.g., samples/mm). As discussed herein, the controller 600 may utilize the sample rate per length to calculate various length-based characteristics, such as node length and/or slack length, based at least in part on the number of consecutive samples identified as indicative of the occurrence of a node or slack section.

Moreover, the controller 600 may be configured to determine the thickness of the yarn 100 at a particular location based on a correlation factor associating the measured position of the reference edge 353, and the position of the second displaceable member 302, and the sample rate per length of yarn.

Figure 3:
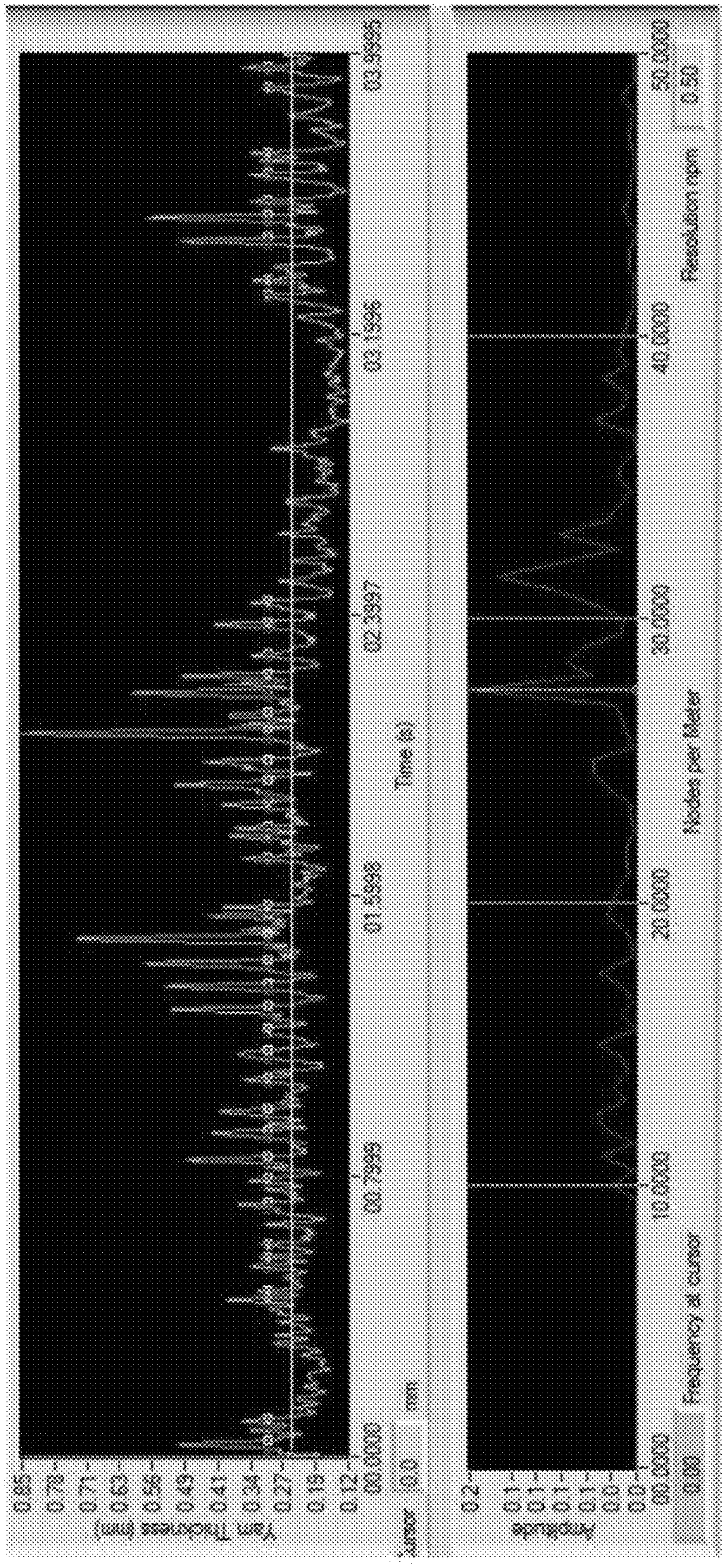
FIG. 3 is a sample output generated by a yarn analyzer according to various embodiments.

To distinguish nodes from slack sections, the controller 600 may comprise one or more node thickness thresholds utilized to determine whether the thickness of the yarn 100 is indicative of a node. In certain embodiments, each of the node thickness thresholds correspond to a particular yarn type, and the node thickness thresholds may be determined based upon characteristics of the corresponding yarn type. For example, the node thickness thresholds may be determined based at least in part on the average yarn thickness, the yarn denier, the yarn filament denier, the average node thickness within the yarn type, the average node length within the yarn type, and/or the like. Accordingly, the controller 600 may be configured to determine that data points indicating that the thickness of the yarn 100 is greater than the node thickness threshold are indicative of the presence of a node, and consecutive data points indicating that the thickness of the yarn 100 is greater than the node thickness threshold collectively define a single node. FIG. 3 graphically illustrates raw data indicative of the measured yarn thickness as a function of time (which may be converted to a measured yarn thickness as a function of yarn length based at least in part on the sample rate and the yarn movement speed). As shown in the upper graph of FIG. 3, the controller 600 may be configured to identify data points exceeding a node thickness threshold (indicated by the plurality of circles disposed along a horizontal line at a defined yarn thickness). Data points between consecutive and adjacent circles and exceeding the node thickness threshold may be identified as nodes.

In various embodiments, the controller 600 may utilize one or more algorithms to identify false-positive identifications of nodes and/or false-positive identifications of slack sections. For example, in addition to the node thickness threshold, the controller 600 may comprise a node peak threshold and/or a slack thickness threshold collectively forming a confidence band around the node thickness threshold. For example, the node peak threshold may identify a thickness greater than the node thickness threshold, and the slack thickness threshold may identify a thickness less than the node thickness threshold. As a specific and non-limiting example, the node peak threshold may be 0.02 mm greater than the node thickness threshold, and the slack thickness threshold may be 0.02 mm less than the node thickness threshold.

To avoid false recognition of nodes and/or slack sections, the controller may be configured to apply one or more rules when identifying nodes and/or slack sections. As non-limiting examples, a first rule may specify that a node (e.g., identified as a string of consecutive data points above the node thickness threshold) must include at least one data point having a thickness above the node peak threshold; a second rule may specify that the end of a node is identified by a data point having a thickness below the slack threshold; a third rule may specify a minimum slack length between consecutive nodes, which may be identified by a minimum number of data points between the end point of a node and at least one data point in a consecutive and separate node; and a fourth rule may specify a minimum node length, which may be identified by a minimum number of consecutive data points between a first data point exceeding the node thickness threshold and a consecutive data point falling below the slack threshold.

Accordingly, the controller 600 may be configured to identify the thickness of the yarn 100 at each data point. The controller 600 may also be configured to identify the gross node count along a length of yarn 100 as the number of identified nodes along the length of the yarn 100). The length of each node may be identified based on the number of consecutive data points collectively defining a node (e.g., considering one or more false recognition rules discussed herein) and the thickness of each node may be identified as the maximum thickness measured within the node, the average thickness of data points collectively defining a node, and/or the like. The length of each slack portion may be identified based on the number of consecutive data points between the end point of one node and the identified beginning of a consecutive and adjacent node (e.g., the length of yarn 100 having a thickness below the node thickness threshold and/or complying with one or more false recognition rules discussed herein). The controller 600 may additionally determine one or more summary parameters, such as the maximum node thickness, average node thickness, average slack length, maximum slack length, slack ratio (e.g., a ratio between the cumulative length of the identified nodes and the cumulative length of the identified slack sections), and/or the like. Moreover, in various embodiments, the controller 600 may be configured to monitor the number of potential nodes within the yarn 100. Potential nodes may be identified as localized yarn thickness peaks that do not qualify as a node (e.g., the yarn peaks do not surpass the node thickness threshold and/or the node peak threshold, the peaks do not satisfy one or more false recognition rules, and/or the like). These potential nodes may be indicative of the presence of relatively weak nodes (e.g., loosely bunched fiber sections) and/or relatively small nodes that do not satisfy the node recognition criteria. In various embodiments, the controller 600 may be configured to perform a Fast Fourier Transform (FFT) on the raw data signal received from the displacement sensor 450, and to identify the frequency having the largest peak within the raw data signal. The identified frequency, which may be provided in nodes/distance (e.g., nodes/meter) may be indicative of the total number of nodes that were attempted to be formed within the yarn 100. The bottom chart of FIG. 3 illustrates an example FFT dataset based on the raw data signal illustrated in the top chart.

Moreover, in various embodiments, the controller 600 may define a maximum node thickness. The maximum node thickness may be utilized to recognize knots between adjacent yarn samples. In such embodiments, a yarn thickness above the maximum node thickness may be identified as a knot utilized to separate a first yarn sample from a second yarn sample. Accordingly, users of the yarn analyzer 10 need not manually thread each individual sample through the entire yarn path, and instead may tie a subsequent sample to the end of a yarn 100 already threaded through the yarn analyzer 10, and may pull the subsequent sample through the yarn path (e.g., via drive mechanism 400). The yarn analyzer 10 (e.g., the controller 600) may be configured to identify the beginning of the subsequent sample upon identifying one or more consecutive data points having a thickness greater than the maximum node thickness. Accordingly, the controller 600 may be configured to automatically recognize a knot and automatically being data collection upon detection of a knot.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. For example, various embodiments may be utilized to measure a thickness of other elongated materials, such as webs, films, and/or the like.

That which is claimed:

1. A yarn analyzer configured for detecting interlaced nodes along a length of yarn, comprising:

a plurality of yarn alignment mechanisms collectively defining a yarn path through the yarn analyzer;

measurement nip members positioned along the yarn path, wherein the measurement nip members comprise:

a fixed member positioned on a first side of the yarn path; and a displaceable member positioned on a second side of the yarn path opposite the first side, wherein the displaceable member is moveable relative to the fixed member and the displaceable member is biased toward the fixed member; and a measurement mechanism comprising:

a mechanical amplifier connected to the displaceable member and configured to amplify the movement of the displaceable member; and a displacement sensor configured to monitor the displacement of a portion of the mechanical amplifier to detect one or more interlaced nodes along the length of yarn based on a detected displacement of the portion of the mechanical amplifier.

2. The yarn analyzer of claim 1, wherein the mechanical amplifier comprises a lever arm pivotable about a pivot axis and a reference component secured relative to a first end of the lever arm at a location spaced a first distance away from the pivot axis wherein:

the displaceable member is secured relative to a second end of the lever arm opposite the first end and spaced a second distance away from the pivot axis, and wherein the first distance is greater than the second distance; and the displacement sensor is configured to monitor the displacement of the displacement member.

3. The yarn analyzer of claim 2, wherein the displaceable member is moveable along an angular displacement path centered about the pivot axis.

4. The yarn analyzer of claim 1, wherein the plurality of alignment mechanisms comprise:

a tensioner configured to maintain a desired tension on a yarn moving along the yarn path;

a drive mechanism configured to drive the yarn along the yarn path; and alignment members configured to align the yarn moving along the yarn path relative to the measurement nip members.

5. The yarn analyzer of claim 1, wherein:

the fixed member comprises a roller rotatably secured at a fixed position relative to the yarn path and positioned at least substantially perpendicular to the yarn path;

the displaceable member comprises a roller rotatably secured relative to the mechanical amplifier and positioned at least substantially parallel to the fixed member.

6. The yarn analyzer of claim 5, wherein the displaceable member is movable along a displacement path at least substantially perpendicular to the yarn path and the fixed member.

7. The yarn analyzer of claim 1, wherein the displacement sensor is a laser displacement sensor.

8. The yarn analyzer of claim 1, further comprising a biasing member configured to bias the displaceable member toward the fixed member.

9. The yarn analyzer of claim 1, further comprising a controller configured to:

receive displacement data from the displacement sensor;

determine a yarn thickness moving through the nip members using the displacement data; and identify one or more nodes along a length of the yarn, wherein each of the one or more nodes has a thickness satisfying one or more node thickness criteria.

10. The yarn analyzer of claim 9, wherein the controller is further configured to monitor node lengths indicative of a consecutive length of yarn having a thickness satisfying the node thickness criteria.

11. The yarn analyzer of claim 9, wherein the controller is further configured to monitor slack lengths indicative of a consecutive length of yarn having a thickness that does not satisfy the node thickness criteria.

12. A method for measuring the thickness of a yarn to detect interlaced nodes along a length of the yarn, the method comprising:

moving a yarn along a yarn path and between measurement nip members, wherein the measurement nip members comprise a fixed member and a displaceable member moveable relative to the fixed member, wherein the displaceable member is biased toward the fixed member, and wherein moving the yarn between the measurement nip members causes the displaceable member to move away from the fixed member by a distance corresponding to the thickness of the yarn;

actuating a mechanical amplifier secured relative to the displacement member to amplify the movement of the displaceable member;

monitoring the displacement of a portion of the mechanical amplifier; and determining the thickness of the yarn based on a displacement distance of the portion of the mechanical amplifier.

13. The method of claim 12, wherein the mechanical amplifier comprises a lever arm pivotable about a pivot axis and a reference component secured relative to a first end of the lever arm at a location spaced a first distance away from the pivot axis, and the displaceable member is secured relative to a second end of the lever arm opposite the first end and spaced a second distance away from the pivot axis, and wherein the first distance is greater than the second distance; and wherein:

actuating the mechanical amplifier comprises pivoting the lever arm about the pivot axis; and monitoring the displacement of the portion of the mechanical amplifier comprises monitoring the displacement of the reference component.

14. The method of claim 13, wherein determining the thickness of the yarn comprises:

measuring the displacement distance of the reference component; and determining a yarn thickness using the displacement distance of the reference component based at least in part on the ratio of the first distance to the second distance.

15. The method of claim 12, further comprising:

storing a series of data points indicative of the thickness of the yarn at adjacent locations along a length of the yarn; and identifying one or more nodes along the length of yarn using the series of data points, wherein each of the one or more nodes has a thickness satisfying one or more node thickness criteria.

16. The method of claim 15, further comprising monitoring node lengths indicative of a consecutive length of yarn having a thickness satisfying the node thickness criteria.

17. The method of claim 15, further comprising monitoring slack lengths indicative of a consecutive length of yarn having a thickness that does not satisfy the node thickness criteria.

* * * * *